United States Patent
Mao et al.

[19]

[11] Patent Number: 6,061,567

[45] Date of Patent: May 9, 2000

[54] SYSTEM AND METHOD FOR CELL PLANNING WITH ALTERNATE ANTENNA POINTING AZIMUTH

[75] Inventors: Tom Mao, Plano; Bertrand Lalanne, Dallas, both of Tex.

[73] Assignee: Ericsson Inc., Research Triangle Park, N.C.

[21] Appl. No.: 09/027,865

[22] Filed: Feb. 24, 1998

[51] Int. Cl.[7] .................................................. H04M 1/19
[52] U.S. Cl. ........................... 455/447; 455/446; 455/562
[58] Field of Search .................................. 455/446, 449, 455/447, 448, 422, 561, 562

[56] References Cited

U.S. PATENT DOCUMENTS

| | | | |
|---|---|---|---|
| 4,144,411 | 3/1979 | Frenkiel | 455/449 |
| 5,073,971 | 12/1991 | Schaeffer | 455/447 |
| 5,365,571 | 11/1994 | Rha et al. | 455/446 |
| 5,428,818 | 6/1995 | Median et al. | 455/447 |
| 5,805,633 | 9/1998 | Uddenfeldt | 455/464 |

FOREIGN PATENT DOCUMENTS

WO 96/34505  10/1996  WIPO.

OTHER PUBLICATIONS

PCT International Search Report dated Jul. 1, 1999.

*Primary Examiner*—Reinhard J. Eisenzopf
*Assistant Examiner*—Eliseo Ramos-Feliciano
*Attorney, Agent, or Firm*—Jenkens & Gilchrist, P.C.

[57] ABSTRACT

A telecommunications system and method for cell planning is disclosed which reduces the co-channel interference between cell clusters by alternating the antenna-pointing azimuth angle between "rows" of cell clusters within a cellular system. Thus, for a mobile terminal within a serving cell of a serving cluster, the antenna pointing azimuth angles for the clusters directly above and below the serving cluster, i.e., in adjacent rows, are opposite that of the antenna pointing azimuth angle of the serving cluster. Furthermore, the cells contained in the serving cluster have the same antenna pointing azimuth angle as those cells within adjacent clusters to the right and left of the serving cluster, i.e., in the same row.

22 Claims, 4 Drawing Sheets

6,061,567

SYSTEM AND METHOD FOR CELL PLANNING WITH ALTERNATE ANTENNA POINTING AZIMUTH

BACKGROUND OF THE PRESENT INVENTION

1. Field of the Invention

The present invention relates generally to telecommunications systems and methods for allocating frequencies among cell clusters, and specifically to alternating the antenna pointing azimuth angle between rows of cell clusters to minimize co-channel interference.

2. Background and Objects of the Present Invention

Cellular telecommunications is one of the fastest growing and most demanding telecommunications applications ever. Today it represents a large and continuously increasing percentage of all new telephone subscriptions around the world. Cellular networks have evolved into two different networks. The European cellular network uses the Global System for Mobile Communication (GSM) digital mobile cellular radio system. In the United States, cellular networks are still primarily analog, but many North American cellular networks have begun deploying Signaling System #7 (SS7), which is a digital signaling standard, to support access of remote databases. European cellular networks have always relied on SS7 for their signaling requirements. However, GSM is currently operated in North America in a newly reserved frequency band in the 1900 MHZ range. The revised GSM standard is also known as Personal Communication Services 1900 or PCS 1900. FIG. 1 illustrates the typical components of a GSM/PCS 1900 wireless communications system, generally designated by the reference numeral 10.

The GSM/PCS 1900 wireless communications system 10 is located within a geographical area serviced by a single provider, hereinafter also referred to as the Public Land Mobile Network (PLMN) 10. The basic components of the wireless communications system 10 are a Base Station System (BSS) 25, a Mobile Switching Center (MSC) 14 and connected Visitor Location Register (VLR) 16 and a Mobile Station (MS) 20. At least one BSS 25 is deployed within the PLMN 10. The BSS 25 acts as an interface between the MSC 14 and a number of MSs 20, each of which may be a mobile wireless telephone, a pager or other equipment.

The MSC/VLR areas 12 include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 18, in turn, is divided into a number of cells 22, only one of which is shown in FIG. 1.

The BSS 25 includes a Base Transceiver Station (BTS) 24 and a Base Station Controller (BSC) 23. At least one BTS 24 operates as a transceiver for transmitting and receiving data and control messages to and from the MS 20 over the air interface within the cell 22. The BSS 25 is generally connected to the MSC 14 through dedicated telephone lines through an A-interface 15. Also connected to the MSC 14 is a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 2.

The VLR 16 is a database containing information about all of the MSs 20 currently located within the MSC/VLR area 12. If a given MS 20 roams into a new MSC/VLR area 12, the VLR 16 connected to that MSC 14 will request data about that Mobile Station (terminal) 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Each service provider has a specified number of frequencies which can be used within the PLMN service area 10 assigned to the service provider. These frequencies are divided up among each of the cells 22. Due to the large number of cells 22 and small number of allowed frequencies, frequency re-use patterns are typically used by service providers to support cellular service for all customers within the PLMN service area 10.

As shown in FIG. 2 of the drawings, frequency re-use patterns are cell-based structures 240, designated therein by the bold outlines, by which the frequency channels within a cellular system 205 are assigned. The most basic unit of any frequency re-use pattern is the cell, designated in FIG. 2 by the reference numeral 200. Each cell 200 in a frequency re-use pattern is assigned a number of frequency channels. A group of cells 200 associated together are also referred to as a cluster 240, which preferably contains all of the frequency channels available to a particular cellular system 205. Groups of clusters 240 are then used to provide cellular coverage over a specific area of the cellular system 205. The association of all frequency channels within a single cluster 240 enables the re-use of the frequency channels throughout the cellular system 205.

The particular cell planning structure illustrated in FIG. 2 is a center-excited, sectorized, seven-cell cluster 240, in which each cluster 240 has seven cells 200, each of which are further divided into three sectors 210, 220 and 230. Each cell 200 within each cluster 240 is assigned a particular frequency group, which is divided into three sub-frequency groups for each of the three sectors 210, 220 and 230, respectively.

It should be understood that each cell 200 contains six antennas (not shown) located at the center of the respective cells 200, two for each sector 210, 220, and 230 therein. One antenna in each sector 210, 220, and 230 transmits messages to the mobile terminals 24 within the respective sectors 210, 220 and 230, while the other antenna in each sector 210, 220 and 230 receives messages from the mobile terminals 24 within the respective sectors 210, 220 and 230. It should be understood that both the receiving and transmitting antennas in one respective sector 210 point along the same direction, angularly displaced from the other antenna pairs in the other respective sectors 220 and 230 in the respective cell 200 by 120 degrees.

For example, in FIG. 2 the uppermost sector 210 in each cell 200 has an antennae pair pointing 30 degrees from north, as shown by the arrow. This pattern is repeated for each lowermost sector 220, which would therefore have its antennas (again represented by an arrow) pointing 150 degrees from north, and each sidemost sector 230, which would therefore have its antennas pointing 270 degrees from north. The degrees with reference to north are hereinafter referred to as antenna-pointing azimuths 215, represented in FIG. 2 by the arrows. Thus, the cells 200 in FIG. 2 have antenna-pointing azimuths 215 of 30 degrees.

As shown in FIG. 2, the clusters 240 in the cellular system 205 are structured and the frequencies within the clusters 240 are allocated therein to increase the re-use distance and to limit co-channel and adjacent channel interferences. Co-channel interference is the interference caused by the usage of the same frequency within two different cell clusters 240. Adjacent channel interference is caused by interference between adjacent cells 200 and frequency channels within the same cluster 240 or within two different clusters 240. In order to reduce interference within the cellular system 205, both co-channel and adjacent channel interference must be minimized. Competing with these requirements is the need for increased system capacity. In general, the smaller the number of cells 200 used in a cluster 240 within a cellular system 205, the higher the capacity of the system and the lower the co-channel re-use distance. A smaller co-channel re-use distance, of course, increases co-channel interference.

The co-channel interference ratio, e.g., Carrier/Interference (C/I), is very critical to improving the network performance in cellular networks 205, including, but not limited to the GSM network, the new Personal Communications System (PCS) network, the D-AMPS network, and the AMPS network. Therefore, by increasing the ratio, e.g., by reducing the interference with respect to the carrier (level) of the desired signal, the co-channel interference is reduced and the signal quality received by mobile terminals 24 within the cell 200 is improved.

It is, therefore, an object of the present invention to reduce the co-channel interference between cell clusters, thereby improving signal quality.

SUMMARY OF THE INVENTION

The present invention is directed to telecommunications systems and methods for cell planning which reduces the co-channel interference between cell clusters by alternating the antenna pointing azimuth angle between "rows" of cell clusters within a cellular system. Thus, for a mobile terminal within a serving cell, the antenna-pointing azimuth angles for the clusters directly above and below the serving cluster of the serving cell, i.e., in adjacent rows, are directly opposite that of the serving antenna pointing azimuth. Furthermore, the cells contained in the serving cluster have the same antenna pointing azimuth angle as those cells within clusters to the right and left of the serving cluster, i.e., in the same row. For example, if the serving cell has an antenna pointing azimuth of 30 degrees from north, the cells within clusters directly above and below the serving cluster of the serving cell have antenna pointing azimuths of −30 degrees from north, while the cells within clusters to the right and left of the serving cell have antenna pointing azimuths of 30 degrees from north.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
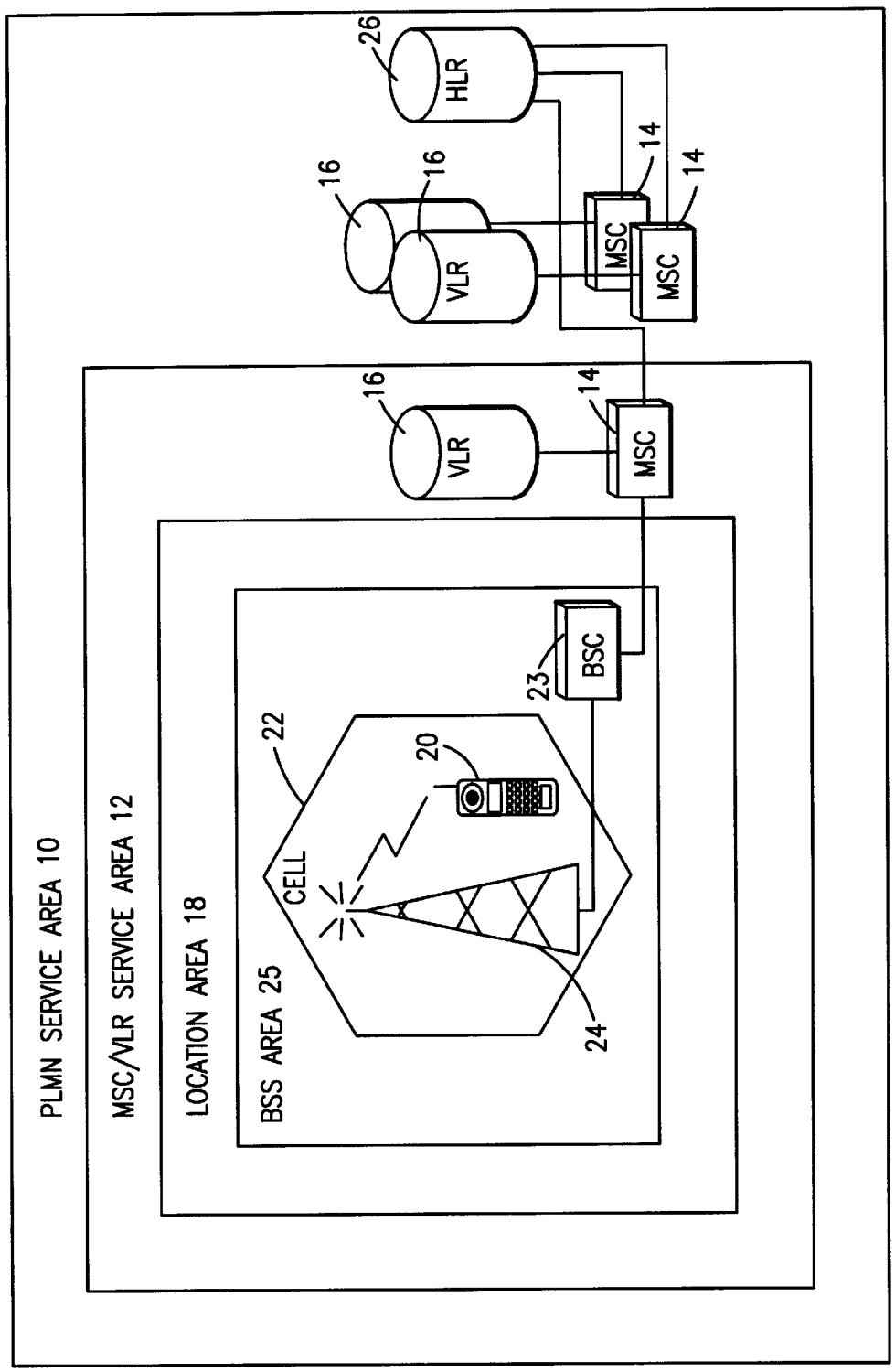
FIG. 1 is a block diagram of a conventional terrestrially-based wireless telecommunications system.
Figure 2:
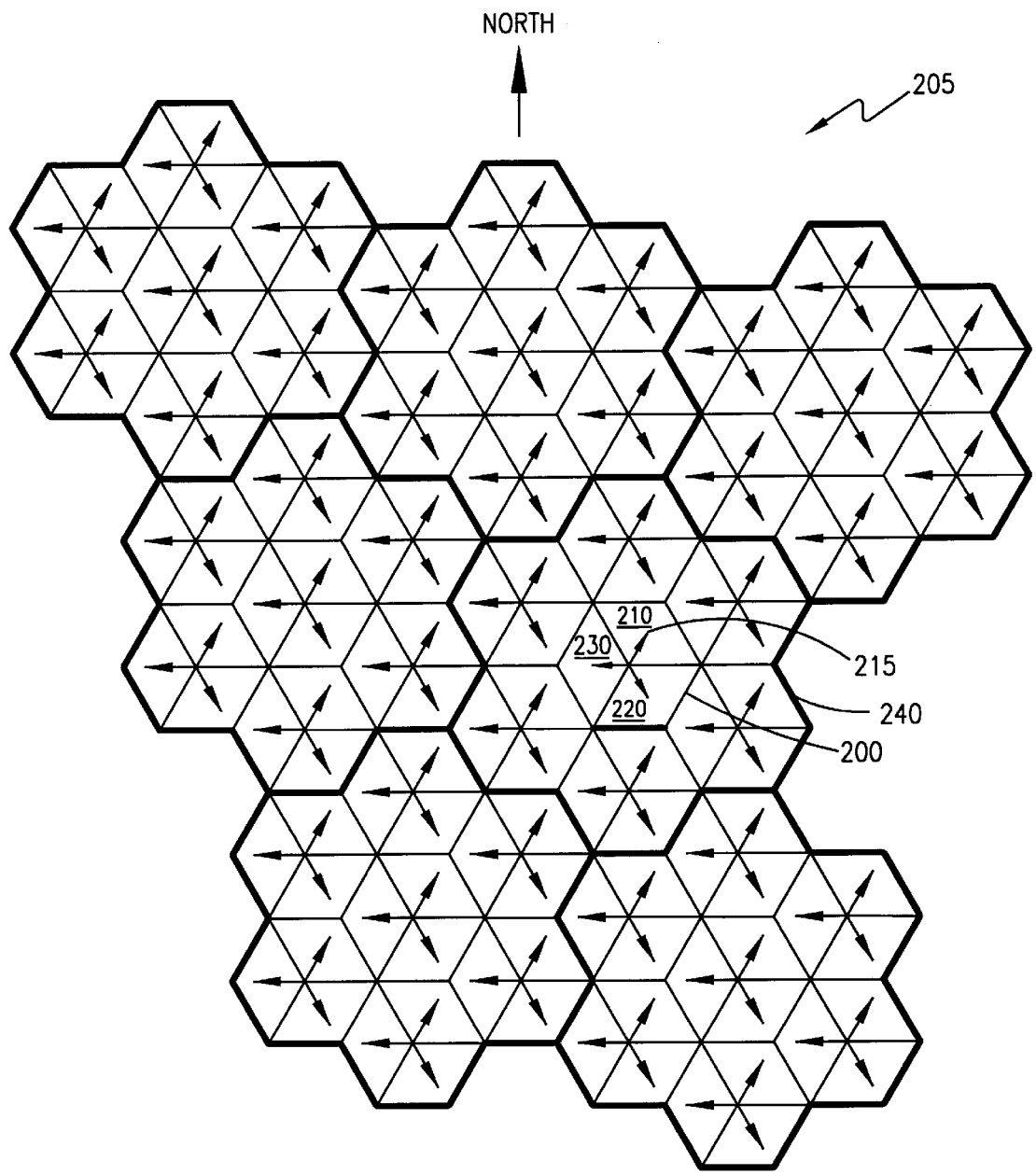
FIG. 2 is an illustration of a conventional frequency re-use plan based upon a center-excited, sectorized, seven-cell cluster.
Figure 3:
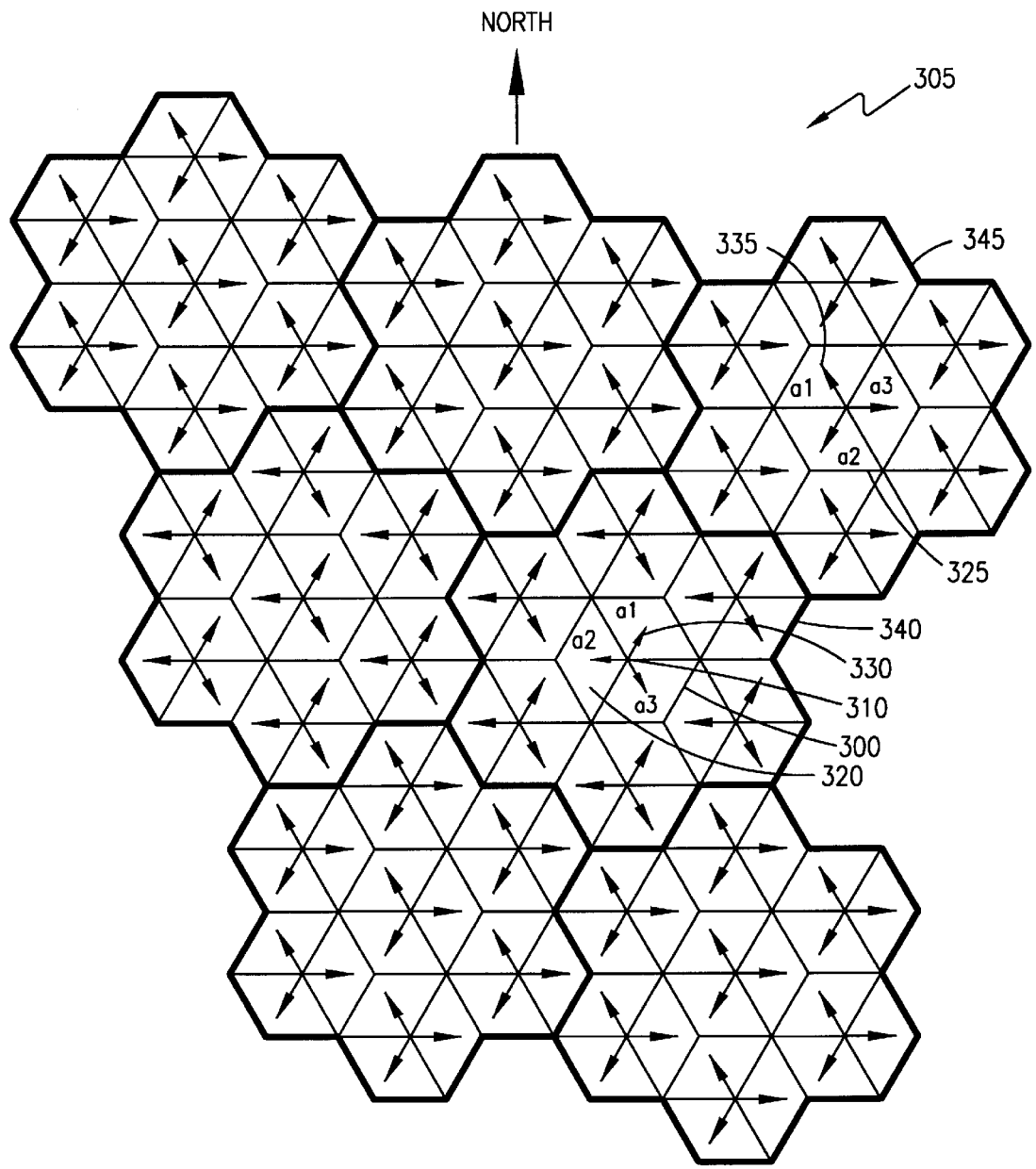
FIG. 3 illustrates a frequency re-use plan based upon the center-excited, sectorized, seven-cell cluster in which an antenna-pointing azimuth for each cluster alternates.

With reference now to FIG. 3 of the drawings, there is illustrated a group of clusters 340 for an N=7 cell planning structure for a center-excited, three-sector directional pattern, where N equals the number of frequencies (cells 300) within each cluster 340. The channel frequencies are re-used for each cluster 340 within a cellular network 305. Each cell 300 contains a single antenna site (base station) 310, preferably substantially at the center thereof, with three sectors 320 having antenna pointing azimuths 330 separated by 120 degrees. Each sector 320 is approximated by the shape of a rhombus and utilizes both a transmitting antenna and a corresponding receiving antenna with the same pointing azimuth 330, represented by an arrow as in FIG. 2.

The center-excited, three-sector pattern splits the hexagon representing the cell 300 into three rhombi 320 and assigns a frequency group having three sub-groups to each cell 300. Each of the three subgroups of one channel frequency group are assigned to a respective sector 320 (rhombus) of the cell, as shown in FIG. 3 of the drawings. The N=7 frequency plan for the sectorized antenna cell configuration preferably uses 21 frequency groups (seven frequencies multiplied by three sectors) having approximately t/21 channels per group, where t equals the total number of available channels in the spectral band. This type of channel assignment is illustrated in Table 1, as follows.

TABLE 1

| | | | Frequency Channel Group | | | | | | | | | | | | | | | | | | |
|---|---|---|---|---|---|---|---|---|---|---|---|---|---|---|---|---|---|---|---|---|---|
| | a1 | b1 | c1 | d1 | e1 | f1 | g1 | a2 | b2 | c2 | d2 | e2 | f2 | g2 | a3 | b3 | c3 | d3 | e3 | f3 | g3 |
| Channel | 1 | 2 | 3 | 4 | 5 | 6 | 7 | 8 | 9 | 10 | 11 | 12 | 13 | 14 | 15 | 16 | 17 | 18 | 19 | 20 | 21 |
| Number | 22 | 23 | 24 | 25 | 26 | 27 | 28 | 29 | 30 | 31 | 32 | 33 | 34 | 35 | 36 | 37 | 38 | 39 | 40 | 41 | 42 |

As can be seen, each frequency group (cell 300) (a, b, c, d, e, f, and g) in the sectorized configuration is divided into three separate sub-groups (sectors 320) (a1, a2, a3; b1, b2, b3; c1, c2, c3, etc.), and frequency assignments from sub-frequency groups are made to each sector 320. This pattern and the frequency assignment scheme associated therewith provides all the basic properties of a conventional re-use pattern, including, but not limited to, repeatability, splitability, and applicability.

However, in order to reduce co-channel interference between cell clusters 340 for a serving cell 300, a cell planning method is depicted which alternates the antenna-pointing azimuths 335 of base stations 310 within cells 325 in the clusters 345 which are above and below the serving cluster 340 containing the serving cell 300, i.e., along a "vertical" direction. Thus, the antenna-pointing azimuths 335 of the base station 310 within cells 325 contained in clusters 345 directly above and below the serving cell 300 are mirrored along the north-south axis with respect to the antenna-pointing azimuth 330 of the serving cell 300. Furthermore, the antenna-pointing azimuths of the base station 310 within cells 300 contained in the serving cluster 340 are pointed in the same direction as that of the antenna-pointing azimuths 330 of the base station 310 within cells 300 to the right and left of the serving cluster 340, i.e., along a "horizontal" direction or row with respect to the serving cluster 340.

For example, as indicated in FIG. 2 of the drawings, a conventional N=7 cluster of three-sector center-excited cells 200 is illustrated in which each uppermost sector 210 of each cell 200 has an antenna-pointing azimuth of 30 degrees from north. With the alternating cell planning structure of present invention as illustrated in FIG. 3, however, the antenna-pointing azimuths 335 of the base station 310 within cells 325 contained in clusters 345 directly above and below the serving cluster 340 are −30 degrees from north.

Figure 4A:
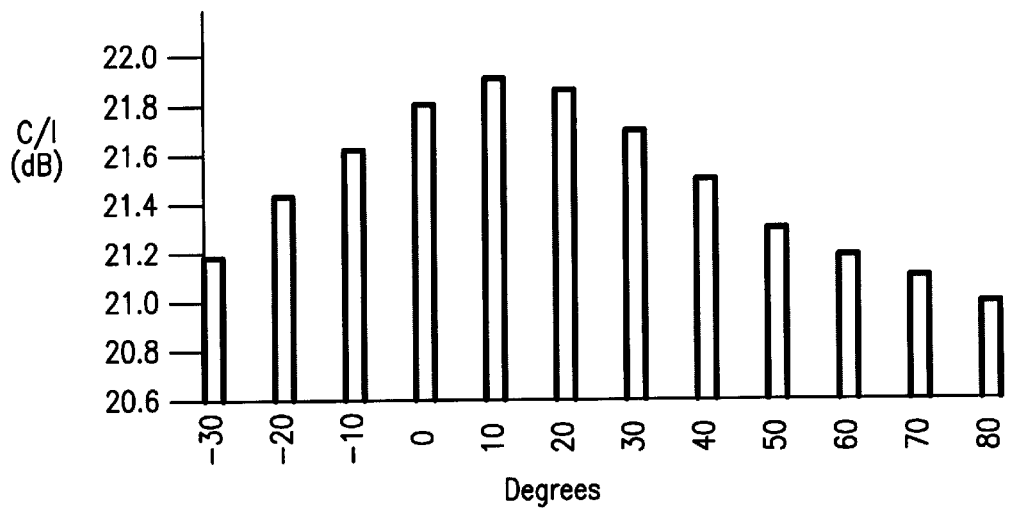
FIGS. 4A and 4B show the co-channel interference ratio for both the conventional frequency re-use plan and the alternating re-use plan of the present invention.
Figure 4B:
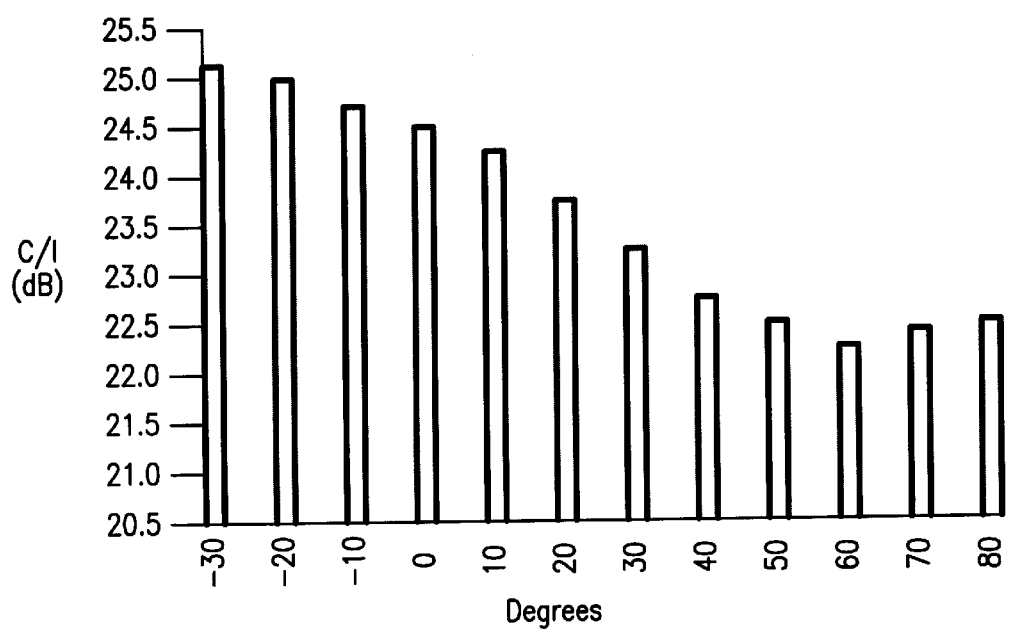

A co-channel interference analysis was performed for both the conventional and the alternating N=7 plans of FIG. 2 and 3, respectively, in a simulation format. As seen in FIG. 4A of the drawings, the conventional N=7 three-sector center-excited cell plan of the type illustrated in FIG. 2 has an overall average co-channel interference ratio (C/I) of 21.4 decibels (dB) and a minimum C/I of 20.9 dB. As shown in FIG. 4B, however, while the alternating N=7 three-sector center-excited cell plan of the present invention gives an overall average C/I of 23.6 dB and a minimum C/I of 22.3 dB.

Calculations were made based on an antenna-pointing azimuth 330 of 30 degrees from north for the serving cell with a coverage area (sector 340) of 120 degrees (60 degrees on either side of the antenna-pointing azimuth 330). Thus, the coverage area was bounded from −30 to 90 degrees from north. As the results indicated, the alternating N=7 plan of the present invention provides reduced co-channel interference.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for reducing the co-channel interference between a serving one of a plurality of cells and an additional one of said cells, said telecommunications system comprising:

a multiplicity of cell clusters, each said cell cluster comprising at least one of said cells, a serving one of said cell clusters containing said serving cell and an additional one of said cell clusters containing said additional cell, said additional cell cluster being adjacent to said serving cell cluster; and a plurality of base stations, each said base station having at least one antenna-pointing azimuth associated therewith, each said cell within said cell clusters having at least one of said base stations substantially centrally located therein, said antenna-pointing azimuth of said base station within said additional cell of said additional cell cluster having a first direction, and said antenna-pointing azimuth of said base station within said serving cell of said serving cell cluster having a second direction;

wherein the angle of said first direction with respect to north mirrors the angle of said second direction with respect to north along a north-south axis.

2. The telecommunications system of claim 1, wherein said multiplicity of cell clusters are formed into a multiplicity of substantially parallel rows of said cell clusters, said serving cell cluster being within a first row of said cell clusters, said additional cell cluster being within a second row of said cell clusters, said first row of cell clusters being substantially parallel to said second row of said cell clusters.

3. The telecommunications system of claim 2, wherein each said antenna-pointing azimuth of each said base station within each said cell within said first row of said cell clusters has said second direction.

4. The telecommunications system of claim 2, wherein each said antenna-pointing azimuth of each said base station within each said cell within said second row of cell clusters has said first direction.

5. The telecommunications system of claim 1, wherein each said cell within said cell clusters contains at least three sectors, each said base station having three antenna-pointing azimuths associated therewith, each said sector having one of said antenna-pointing azimuths associated therewith.

6. The telecommunications system of claim 5, wherein each said base station within each said cell has a transmitting antenna and a receiving antenna for each said sector, the respective said transmitting antenna and receiving antenna in a given one of said sectors being pointed in the direction of said antenna-pointing azimuth of said given sector.

7. The telecommunications system of claim 6, wherein the direction of each said antenna-pointing azimuth is the angle of the respective said transmitting and receiving antennas with reference to north.

8. The telecommunications system of claim 1, wherein each said cell cluster contains seven of said cells.

9. The telecommunications system of claim 1, wherein each said cell cluster has a cluster frequency group associated therewith, and each said cell within a given one of said cell clusters has a cell frequency group associated therewith, each said cell frequency group within said given cell cluster being different.

10. The telecommunications system of claim 9, wherein each said cell cluster has the same cluster frequency group.

11. The telecommunications system of claim 9, wherein each said cell contains at least three sectors, each said cell frequency group associated with a given one of said cells being divided into at least three sub-frequency groups, each said sector within said given cell having one of said sub-frequency groups associated therewith.

12. A method for planning a cell cluster layout which reduces the co-channel interference between a serving one of a plurality of cells and an additional one of said cells within a telecommunications system, each said cell having at least one base station substantially centrally located therein, said method comprising the steps of:

establishing at least one antenna-pointing azimuth associated with said base station within said serving cell and said additional cell, said serving cell being contained in a serving one of a multiplicity of cell clusters, said additional cell being contained in an additional one of said cell clusters, said additional cell cluster being adjacent to said serving cell cluster, said antenna-pointing azimuth of said base station within said additional cell having a first direction and said antenna-pointing azimuth of said base station within said serving cell having a second direction; and mirroring the angle of said first direction with respect to north and the angle of said second direction with respect to north along a north-south axis.

13. The method of claim 12, wherein said multiplicity of cell clusters are formed into a multiplicity of substantially parallel rows of said cell clusters, said serving cell cluster being within a first row of said cell clusters, said additional cell cluster being within a second row of said cell clusters, said first row of cell clusters being substantially parallel to said second row of said cell clusters.

14. The method of claim 13, wherein each said antenna-pointing azimuth of each said base station within each said cell within said first row of said cell clusters has said second direction.

15. The method of claim 13, wherein each said antenna-pointing azimuth of each said base station within each said cell within said second row of cell clusters has said first direction.

16. The method of claim 12, wherein each said cell within said cell clusters contains at least three sectors, each said base station having three antenna-pointing azimuths associated therewith, each said sector having one of said antenna-pointing azimuths associated therewith.

17. The method of claim 16, wherein each said base station within each said cell has a transmitting antenna and a receiving antenna for each said sector, the respective said transmitting antenna and receiving antenna in a given one of said sectors being pointed in the direction of said antenna-pointing azimuth of said given sector.

18. The method of claim 17, wherein the direction of each said antenna-pointing azimuth is the angle of the respective said transmitting and receiving antennas with reference to north.

19. The method of claim 12, wherein each said cell cluster contains seven of said cells.

20. The method of claim 12, wherein each said cell cluster has a cluster frequency group associated therewith, and each said cell within a given one of said cell clusters has a cell frequency group associated therewith, each said cell frequency group within said given cell cluster being different.

21. The method of claim 20, wherein each said cell cluster has the same cluster frequency group.

22. The method of claim 20, wherein each said cell contains at least three sectors, each said cell frequency group associated with a given one of said cells being divided into at least three sub-frequency groups, each said sector within said given cell having one of said sub-frequency groups associated therewith.

* * * * *